(12) United States Patent
Nishiyama et al.

(10) Patent No.: US 10,357,747 B2
(45) Date of Patent: Jul. 23, 2019

(54) METHOD FOR PRODUCING SPIRAL WOUND SEPARATION MEMBRANE ELEMENT

(71) Applicant: NITTO DENKO CORPORATION, Osaka (JP)

(72) Inventors: Shinya Nishiyama, Osaka (JP); Taisuke Yamaguchi, Osaka (JP); Takahisa Konishi, Osaka (JP); Hiroki Fujioka, Osaka (JP); Takashi Kamada, Osaka (JP); Shinichi Inoue, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/763,331

(22) PCT Filed: Sep. 30, 2016

(86) PCT No.: PCT/JP2016/079055
§ 371 (c)(1),
(2) Date: Mar. 26, 2018

(87) PCT Pub. No.: WO2017/057692
PCT Pub. Date: Apr. 6, 2017

(65) Prior Publication Data
US 2018/0280890 A1   Oct. 4, 2018

(30) Foreign Application Priority Data

Sep. 30, 2015  (JP) ................................. 2015-192541
Sep. 29, 2016  (JP) ................................. 2016-191752

(51) Int. Cl.
C02F 1/44       (2006.01)
B01D 61/02      (2006.01)
B01D 63/10      (2006.01)
B01D 67/00      (2006.01)
B01D 69/12      (2006.01)
B01D 71/38      (2006.01)
B01D 71/56      (2006.01)
B01D 71/68      (2006.01)
C02F 103/04     (2006.01)
C02F 103/08     (2006.01)
C02F 103/10     (2006.01)
C02F 103/32     (2006.01)

(52) U.S. Cl.
CPC ......... B01D 67/0088 (2013.01); B01D 63/10 (2013.01); B01D 63/103 (2013.01); B01D 69/12 (2013.01); B01D 71/68 (2013.01); C02F 1/44 (2013.01); B01D 61/02 (2013.01); B01D 69/125 (2013.01); B01D 71/56 (2013.01); C02F 2103/04 (2013.01); C02F 2103/08 (2013.01); C02F 2103/10 (2013.01); C02F 2103/32 (2013.01); Y02A 20/131 (2018.01)

(58) Field of Classification Search
CPC .......... B05D 3/007; B05D 3/107; B05D 7/04; B05D 7/24; B01D 67/0088; B01D 71/68; B01D 69/12; B01D 63/10; B01D 71/38; B01D 69/125; B01D 71/56; B01D 61/02; C02F 1/44; C02F 2103/32; C02F 2103/08; C02F 2103/10; C02F 2103/04; Y02A 20/131
USPC ............. 427/154, 155, 336, 337; 210/493.4; 55/399, 498, 520
See application file for complete search history.

(56) References Cited

U.S. PATENT DOCUMENTS

| | | | | |
|---|---|---|---|---|
| 4,005,012 A * | 1/1977 | Wrasidlo | ............. | B01D 69/125 210/500.28 |
| 5,234,598 A * | 8/1993 | Tran | ........................ | B01D 71/56 210/490 |
| 6,177,011 B1 | 1/2001 | Hachisuka et al. | | |
| 6,454,942 B1 | 9/2002 | Shintani et al. | | |
| 2006/0043013 A1 | 3/2006 | Hero et al. | | |
| 2011/0168626 A1 | 7/2011 | Tanaka et al. | | |
| 2013/0020251 A1* | 1/2013 | Ichikawa | ............... | B01D 69/02 210/490 |

(Continued)

FOREIGN PATENT DOCUMENTS

| | | |
|---|---|---|
| JP | 2000-354743 | 12/2000 |
| JP | 2006-68644 | 3/2006 |
| JP | 2012-213686 | 11/2012 |

(Continued)

OTHER PUBLICATIONS

Rana et al., "Surface Modifications for Antifouling Membranes," Chem. Rev. 2010, 110, 2448-2471. (Year: 2010).*

(Continued)

*Primary Examiner* — William P Fletcher, III
(74) *Attorney, Agent, or Firm* — Greenblum & Bernstein, P.L.C.

(57) ABSTRACT

A method for producing a spiral wound separation membrane element includes preparing a composite semipermeable membrane having a skin layer on the surface of a porous support. The method further includes forming on the skin layer a protective layer containing 35 mg/m$^2$ or more of an anionic polyvinyl alcohol to prepare a protective layer-equipped composite semipermeable membrane, preparing an unwashed spiral wound separation membrane element from the protective layer-equipped composite semipermeable membrane, and passing wash water through the unwashed spiral wound separation membrane element to remove the protective layer on the skin layer.

1 Claim, No Drawings

(56) References Cited

U.S. PATENT DOCUMENTS

2015/0367288 A1  12/2015  Haynes et al.
2016/0166993 A1   6/2016  Lee et al.

FOREIGN PATENT DOCUMENTS

| JP | 5568835 | 8/2014 | |
|----|---------|--------|---|
| WO | 97/34686 | 9/1997 | |
| WO | 2014/158660 | 10/2014 | |
| WO | WO-2014158660 A1 * | 10/2014 | ......... B01D 67/0088 |
| WO | 2015/016683 | 2/2015 | |

OTHER PUBLICATIONS

International Search Report issued in PCT/JP2016/079055, dated Oct. 25, 2016.
English translation of International Preliminary Report on Patentability issued in PCT/JP2016/079055, dated Apr. 12, 2018.
Official Communication issued in European Patent Office (EPO) Patent Application No. 16851861.1, dated May 20, 2019.

* cited by examiner

METHOD FOR PRODUCING SPIRAL WOUND SEPARATION MEMBRANE ELEMENT

TECHNICAL FIELD

The present invention relates to a spiral wound separation membrane element containing a composite semipermeable membrane. The spiral wound separation membrane element is suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the element can be used for concentration of active ingredients in foodstuffs usage, for an advanced water treatment, such as removal of harmful component in water purification and sewage usage etc. Moreover, the element can be used for waste water treatment in oil fields or shale gas fields.

BACKGROUND ART

The composite semipermeable membrane is called an RO (reverse osmosis) membrane, an NF (nanofiltration) membrane, or a FO (forward osmosis) membrane, depending on the filtration performance and treatment method of the membrane, and such membrane can be used for the production of ultrapure water, seawater desalination, desalination of brackish water, waste water recycling treatment, or the like.

As a composite semipermeable membrane that is frequently used industrially, for example, there is mentioned a composite semipermeable membrane wherein a skin layer containing a polyamide resin obtained by reacting a polyfunctional amine component with a polyfunctional acid halide component is provided on the surface of a porous support. In general, the skin layer surface of the composite semipermeable membrane has a negative charge due to the influence of the carboxylic acid remaining in the polyamide resin. Therefore, when water (for example, sewage) containing an ionic organic contaminant such as a surfactant is treated with the composite semipermeable membrane, the organic contaminant is adsorbed on the skin layer surface by electrostatic attraction and water permeability is gradually reduced, which is a problem.

In order to solve the above problems, for example, Patent Document 1 has proposed a reverse osmosis composite membrane in which a surface layer of a separation active layer is coated with a polyvinyl alcohol that is an electrically neutral organic polymer insoluble in water of 25° C. and soluble in water of 80° C. and has a saponification degree of 99% or more.

In addition, Patent Document 2 has proposed a reverse osmosis membrane to which a cationic polymer is attached and then an anionic polyvinyl alcohol is attached.

On the other hand, as a fluid separation element conventionally used for reverse osmosis filtration, ultrafiltration, microfiltration and the like, for example, there is known a spiral wound separation membrane element in which a unit consisting of a feed spacer for guiding a feed-side fluid to the surface of a separation membrane, a separation membrane for separating the feed-side fluid, and a permeate spacer for guiding to a core tube a permeation-side fluid that has passed through the separation membrane and is separated from the feed-side fluid is wound around a perforated core tube (Patent Documents 3 and 4).

PRIOR ART DOCUMENTS

Patent Documents

Patent Document 1: WO97/034686
Patent Document 2: Japanese patent No. 5568835
Patent Document 3: JP-A-2000-354743
Patent Document 4: JP-A-2006-68644

SUMMARY OF THE INVENTION

Problems to be Solved by the Invention

In the case where the composite semipermeable membrane is used as a separation membrane of such a spiral wound separation membrane element, a problem is found that the membrane performance of the composite semipermeable membrane before processing into an element is greatly reduced when processed into an element.

The purpose of the present invention is to provide a method for producing a spiral wound separation membrane element that is capable of maintaining the membrane performance of a composite semipermeable membrane before processing into an element and has excellent membrane performance.

Means for Solving the Problems

As a result of intensive studies to solve the above problems, the inventors of the present invention have found that the above object can be achieved by the following method for producing a spiral wound separation membrane element. The present invention has been completed based on this finding.

That is, the present invention relates to a method for producing a spiral wound separation membrane element, comprising:

a step for preparing a composite semipermeable membrane having a skin layer on the surface of a porous support;

a step for forming on the skin layer a protective layer containing 35 mg/m$^2$ or more of an anionic polyvinyl alcohol to prepare a protective layer-equipped composite semipermeable membrane;

a step for preparing an unwashed spiral wound separation membrane element using the protective layer-equipped composite semipermeable membrane; and a step for passing wash water through the unwashed spiral wound separation membrane element to remove the protective layer on the skin layer.

The inventor of the present invention has studied the reason why the membrane performance of the composite semipermeable membrane before processing into an element greatly deteriorates when the composite semipermeable membrane is processed into an element. As a result, the reason was found to be due to the following cause.

The composite semipermeable membrane is prepared on a line with rolls and then wound on a drum. Also, when processing a composite semipermeable membrane into an element, such membrane is rewound from the drum and is transported over a long distance on a line having rolls. Therefore, the surface of the skin layer is physically damaged during the conveying process, the winding process, the rewinding process, the element producing process, and the like, from the time that the composite semipermeable membrane is produced until the membrane is processed into an element. As a result, it is thought that the membrane performance of the composite semipermeable membrane greatly deteriorates when such membrane is processed into an element.

As in the present invention, after preparing the composite semipermeable membrane, a protective layer containing 35 mg/m² or more of an anionic polyvinyl alcohol is formed on the skin layer to protect the surface of the skin layer, so that it is possible to suppress the skin layer surface from being physically damaged in each step until the element is prepared. Further, in the present invention, it is necessary to remove the protective layer on the skin layer after the element is prepared. This is because if the protective layer is left to remain, the water permeability of the element decreases. Although it is preferable that the protective layer is completely removed, the protective layer may be left to such an extent that the water permeability of the element does not decrease.

In the present invention, an anionic polyvinyl alcohol is used as a raw material for the protective layer in order to facilitate removal of the protective layer by passing wash water through the element. The surface of the skin layer containing the polyamide resin generally has a negative charge due to the influence of the carboxylic acid remaining in the polyamide resin. Therefore, it can be inferred that by using the anionic polyvinyl alcohol as a raw material for the protective layer, it becomes easy to remove the protective layer by electrical repulsion against the surface of the skin layer. However, the present invention is not limited or restricted at all by this inference.

When the content of the anionic polyvinyl alcohol in the protective layer is less than 35 mg/m², the surface of the skin layer is susceptible to physical damages in each step until the element is prepared.

Effect of the Invention

According to the production method of the present invention, a spiral wound separation membrane element having excellent membrane performance equivalent to the membrane performance of a composite semipermeable membrane before processing into an element can be produced by a simple method.

MODE FOR CARRYING OUT THE INVENTION

Hereinafter, the embodiments of the present invention will be described. The method for producing the spiral wound separation membrane element, comprising:

a step for preparing a composite semipermeable membrane having a skin layer on the surface of a porous support;

a step for forming on the skin layer a protective layer containing 35 mg/m² or more of an anionic polyvinyl alcohol to prepare a protective layer-equipped composite semipermeable membrane;

a step for preparing an unwashed spiral wound separation membrane element using the protective layer-equipped composite semipermeable membrane; and a step for passing wash water through the unwashed spiral wound separation membrane element to remove the protective layer on the skin layer.

The material for forming the skin layer is not particularly limited, and examples thereof include cellulose acetate, ethyl cellulose, polyether, polyester, polyamide, and the like. In particular, a skin layer containing a polyamide resin obtained by polymerizing a polyfunctional amine component and a polyfunctional acid halide component is preferable.

The polyfunctional amine component is defined as a polyfunctional amine having two or more reactive amino groups, and includes aromatic, aliphatic, and alicyclic polyfunctional amines.

The aromatic polyfunctional amines include, for example, m-phenylenediamine, p-phenylenediamine, o-phenylenediamine, 1,3,5-triamino benzene, 1,2,4-triamino benzene, 3,5-diaminobenzoic acid, 2,4-diaminotoluene, 2,6-diaminotoluene, N,N'-dimethyl-m-phenylenediamine, 2,4-diaminoanisole, amidol, xylylene diamine etc.

The aliphatic polyfunctional amines include, for example, ethylenediamine, propylenediamine, tris(2-aminoethyl)amine, n-phenylethylenediamine, etc.

The alicyclic polyfunctional amines include, for example, 1,3-diaminocyclohexane, 1,2-diaminocyclohexane, 1,4-diaminocyclohexane, piperazine, 2,5-dimethylpiperazine, 4-aminomethyl piperazine, etc.

These polyfunctional amines may be used independently, and two or more kinds may be used in combination. In order to obtain a skin layer having a higher salt-rejecting property, it is preferred to use the aromatic polyfunctional amines.

The polyfunctional acid halide component represents polyfunctional acid halides having two or more reactive carbonyl groups.

The polyfunctional acid halides include aromatic, aliphatic, and alicyclic polyfunctional acid halides.

The aromatic polyfunctional acid halides include, for example trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, chlorosulfonyl benzenedicarboxylic acid dichloride etc.

The aliphatic polyfunctional acid halides include, for example, propanedicarboxylic acid dichloride, butane dicarboxylic acid dichloride, pentanedicarboxylic acid dichloride, propane tricarboxylic acid trichloride, butane tricarboxylic acid trichloride, pentane tricarboxylic acid trichloride, glutaryl halide, adipoyl halide etc.

The alicyclic polyfunctional acid halides include, for example, cyclopropane tricarboxylic acid trichloride, cyclobutanetetracarboxylic acid tetrachloride, cyclopentane tricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, tetrahydrofuran dicarboxylic acid dichloride, etc.

These polyfunctional acid halides may be used independently, and two or more kinds may be used in combination. In order to obtain a skin layer having higher salt-rejecting property, it is preferred to use aromatic polyfunctional acid halides. In addition, it is preferred to form a cross linked structure using polyfunctional acid halides having trivalency or more as at least a part of the polyfunctional acid halide components.

Furthermore, in order to improve performance of the skin layer including the polyamide resin, polymers such as polyvinyl alcohol, polyvinylpyrrolidone, and polyacrylic acids etc., and polyhydric alcohols, such as sorbitol and glycerin, may be copolymerized.

The porous support for supporting the skin layer is not especially limited as long as it has a function for supporting the skin layer, and usually ultrafiltration membrane having micro pores with an average pore size approximately 10 to 500 angstroms may preferably be used. Materials for formation of the porous support include various materials, for example, polyarylether sulfones, such as polysulfones and polyether sulfones; polyimides; polyvinylidene fluorides; etc., and polysulfones and polyarylether sulfones are especially preferably used from a viewpoint of chemical, mechanical, and thermal stability. The thickness of this porous support is usually approximately 25 to 125 μm, and preferably approximately 40 to 75 μm, but the thickness is not necessarily limited to them. The porous support may be reinforced with backing by cloths, nonwoven fabric, etc.

Processes for forming the skin layer including the polyamide resin on the surface of the porous support is not in particular limited, and any publicly known methods may be used. For example, the publicly known methods include an interfacial condensation method, a phase separation method, a thin film application method, etc. The interfacial condensation method is a method, wherein an amine aqueous solution containing a polyfunctional amine component, an organic solution containing a polyfunctional acid halide component are forced to contact together to form a skin layer by an interfacial polymerization, and then the obtained skin layer is laid on a porous support, and a method wherein a skin layer of a polyamide resin is directly formed on a porous support by the above-described interfacial polymerization on a porous support. Details, such as conditions of the interfacial condensation method, are described in Japanese Patent Application Laid-Open No. S58-24303, Japanese Patent Application Laid-Open No. H01-180208, and these known methods are suitably employable.

The thickness of the skin layer formed on the porous support is not in particular limited, and it is usually approximately 0.05 to 2 μm, and preferably 0.1 to 1 μm.

Further, conventionally known various treatments may be applied to the composite semipermeable membrane so as to improve its salt rejection property, water permeability, and oxidation resistance.

After preparing the composite semipermeable membrane, a protective layer containing an anionic polyvinyl alcohol is formed on the skin layer to prepare a protective layer-equipped composite semipermeable membrane.

The anionic polyvinyl alcohol is a polyvinyl alcohol having an anionic functional group, and examples of the anionic functional group include a carboxyl group, a sulfonic acid group, a phosphoric acid group, and the like. Of these, a carboxyl group or a sulfonic acid group is preferable.

A method for introducing an anionic functional group into the polyvinyl alcohol is not particularly limited, and a known method can be adopted for such purpose.

Examples of commercially available products of the anionic polyvinyl alcohol include KL-118, KL-318, KL-506, KM-118 and KM-618 (these are manufactured by Kuraray Co., Ltd.), and GOHSENEX CKS 50, GOHSENEX T-330H, and GOHSENEX T-350 (these are manufactured by The Nippon Synthetic Chemical Industry Co., Ltd.).

The protective layer is formed by coating a solution containing an anionic polyvinyl alcohol onto a skin layer, followed by drying. Examples of the coating method include spraying, coating, and showering. As the solvent, in addition to water, an organic solvent which does not deteriorate the performance of the skin layer or the like may be used in combination. Examples of such organic solvents include aliphatic alcohols such as methanol, ethanol, propanol and butanol; and lower alcohols such as methoxy methanol and methoxy ethanol.

Although the temperature of the solution is not particularly limited, the temperature is preferably 10 to 90° C., more preferably 10 to 60° C. from the viewpoint of prevention of deterioration of the skin layer and ease of handling.

The temperature at which the solution coated onto the skin layer is dried is not particularly limited, but is usually about 60 to 160° C., preferably 80 to 150° C.

The protective layer needs to contain 35 mg/m$^2$ or more of an anionic polyvinyl alcohol, preferably 39 mg/m$^2$ or more, more preferably 55 mg/m$^2$ or more, even more preferably 100 mg/m$^2$ or more, still even more preferably 150 mg/m$^2$ or more, particularly preferably 170 mg/m$^2$ or more. On the other hand, if the content of the anionic polyvinyl alcohol in the protective layer is too large, it becomes difficult to remove the protective layer by water passing treatment, so that the content of the anionic polyvinyl alcohol in the protective layer is preferably 2000 mg/m$^2$ or less, more preferably 1000 mg/m$^2$ or less, even more preferably 500 mg/m$^2$ or less, particularly preferably 300 mg/m$^2$ or less.

Thereafter, an unwashed spiral wound separation membrane element is produced using the protective layer-equipped composite semipermeable membrane. The unwashed spiral wound separation membrane element includes the feed spacer, the protective layer-equipped composite semipermeable membrane, and the permeate spacer.

Known ones for the feed spacer and the permeate spacer can be used without particular limitation, and examples thereof include a net-like material, a knitted material, a mesh-like material, a grooved sheet, a corrugated sheet, and the like.

The unwashed spiral wound separation membrane element can be produced, for example, by stacking a feed spacer arranged in the interspace of the protective layer-equipped composite semipermeable membrane that is fold in half and a permeate spacer; applying an adhesive for forming a sealing portion for preventing mixing of a feed-side fluid and a permeation-side fluid to peripheral portions (three sides) of the protective layer-equipped composite semipermeable membrane to prepare a separation membrane unit; and winding one or more separation membrane units spirally around a core tube to further seal the periphery of the separation membrane unit.

Thereafter, wash water is passed through the unwashed spiral wound separation membrane element, so that the protective layer on the skin layer is removed to prepare a spiral wound separation membrane element.

Although the temperature of the wash water is not particularly limited, such temperature is usually about 10 to 40° C., and is preferably 25 to 40° C. from the viewpoint of removal efficiency of the protective layer and the like.

Although the pressure at the time of passing water is not particularly limited, such pressure is usually about 0.1 to 3.0 MPa, and is preferably 0.5 to 1.5 MPa from the viewpoint of removal efficiency of the protective layer and the like.

Although it is preferable that the protective layer is completely removed, the protective layer may be left to such an extent that the water permeability of the spiral wound separation membrane element is not lowered. Specifically, the content of the anionic polyvinyl alcohol in the protective layer after water passing treatment is preferably 200 mg/m$^2$ or less, more preferably 100 mg/m$^2$ or less, even more preferably 75 mg/m$^2$ or less, still even more preferably 33 mg/m$^2$ or less, particularly preferably 23 mg/m$^2$ or less.

The spiral wound separation membrane element obtained by the production method of the present invention has excellent membrane performance equivalent to that of the composite semipermeable membrane before processing into the element.

EXAMPLE

The present invention will, hereinafter, be described with reference to Examples, but the present invention is not limited at all by these Examples.

Comparative Example 1

An amine aqueous solution containing 3% by weight of m-phenylenediamine, 0.15% by weight of sodium lauryl sulfate, 3% by weight of triethylamine, 6% by weight of camphorsulfonic acid, and 4% by weight of isopropyl alcohol was coated on a porous polysulfone supporting membrane (average pore diameter on the thin membrane forming side: 20 nm, asymmetric membrane) and then an excess aqueous amine solution was removed to form an aqueous solution coating layer. Next, an isooctane solution containing 0.2% by weight of trimesic acid chloride was applied to the surface of the aqueous solution coating layer. Thereafter, the excess solution was removed, and the coating layer was further kept in a hot air dryer at 130° C. for 3 minutes to form a skin layer (thickness: 1 μm) containing a polyamide resin on the porous polysulfone supporting membrane, thereby to prepare a composite semipermeable membrane.

Example 1

An aqueous solution containing 0.7% by weight of KL-318 (carboxylic acid-modified polyvinyl alcohol manufactured by Kuraray Co., Ltd., polymerization degree: 1800, saponification degree: 87.5%) and 30% by weight of isopropyl alcohol was applied onto the skin layer of the composite semipermeable membrane prepared in Comparative Example 1 and dried at 130° C. for 3 minutes to form a protective layer, thereby to prepare a protective layer-equipped composite semipermeable membrane.

Example 2

A protective layer-equipped composite semipermeable membrane was prepared in the same manner as in Example 1 except that the content of KL-318 in the aqueous solution was changed to 0.07% by weight.

Example 3

A protective layer-equipped composite semipermeable membrane was prepared in the same manner as in Example 1 except that the content of KL-318 in the aqueous solution was changed to 0.037% by weight.

Example 4

A protective layer-equipped composite semipermeable membrane was prepared in the same manner as in Example 1 except that the content of KL-318 in the aqueous solution was changed to 0.023% by weight.

Example 5

A protective layer-equipped composite semipermeable membrane was prepared in the same manner as in Example 1 except that the content of KL-318 in the aqueous solution was changed to 0.018% by weight.

Example 6

A protective layer-equipped composite semipermeable membrane was prepared in the same manner as in Example 1 except that the content of KL-318 in the aqueous solution was changed to 0.016% by weight.

Comparative Example 2

A protective layer-equipped composite semipermeable membrane was prepared in the same manner as in Example 1 except that GOHSENOL NL-05 (manufactured by Nippon Synthetic Chemical Industry Co. Ltd., polyvinyl alcohol, polymerization degree: 500, saponification degree: 99.2%) was used in place of KL-318.

Comparative Example 3

A protective layer-equipped composite semipermeable membrane was prepared in the same manner as in Example 1 except that the content of KL-318 in the aqueous solution was changed to 0.007% by weight.

Comparative Example 4

A protective layer-equipped composite semipermeable membrane was prepared in the same manner as in Example 1 except that the content of KL-318 in the aqueous solution was changed to 0.0007% by weight.

Comparative Example 5

A protective layer-equipped composite semipermeable membrane was prepared in the same manner as in Example 1 except that the content of KL-318 in the aqueous solution was changed to 0.012% by weight.

[Evaluation and Measurement Methods]
(Measurement of Content of Polyvinyl Alcohol Contained in Protective Layer)

An aqueous solution containing each polyvinyl alcohol used in Examples and Comparative Examples at a predetermined concentration was applied onto the skin layer of the composite semipermeable membrane prepared in Comparative Example 1, and dried to form a protective layer, thereby to prepare a protective layer-equipped composite semipermeable membrane. Using the prepared protective layer-equipped composite semipermeable membrane, a calibration curve was prepared from the correlation between the relative strength measured with TOF-SIMS 5 (manufactured by ION-TOF) and the amount of polyvinyl alcohol. Thereafter, the protective layer-equipped composite semipermeable membranes prepared in Examples 1 to 6 and Comparative Examples 2 to 5 were measured with TOF-SIMS 5, and the content of polyvinyl alcohol contained in each of the protective layer-equipped composite semipermeable membranes was calculated based on the calibration curve.

With respect to the protective layer-equipped composite semipermeable membrane after measurement of the permeation flux and salt rejection ratio (after water passing treatment), the content of polyvinyl alcohol contained in the protective layer was calculated in the same manner as described above.

(Measurement of Permeation Flux and Salt Rejection Ratio)

The protective layer-equipped composite semipermeable membranes prepared in Examples 1 to 6 and Comparative Examples 2 to 5 and the composite semipermeable membrane prepared in Comparative Example 1 were cut into a predetermined shape and size and placed in a cell for flat membrane evaluation. Then, water of 25° C. was passed through the membrane at a pressure of 1.5 MPa for 1 to 2 hours. Thereafter, an aqueous solution containing 2000 mg/L of NaCl and adjusted to pH 7 was brought into contact with the membrane for 30 minutes at 25° C. by applying a differential pressure of 1.55 MPa between the feed side and the permeation side of the membrane. A permeation velocity and electric conductivity of the permeated water obtained by this operation were measured, and a permeation flux (m$^3$/m$^2$·d) and a salt rejection ratio (%) were calculated. The correlation (calibration curve) of the NaCl concentration and electric conductivity of the aqueous solution was made beforehand, and the salt rejection ratio was calculated by the following equation.

Salt Rejection Ratio (%)={1−(NaCl concentration in permeated liquid [mg/L])/(NaCl concentration in supply solution) [mg/L]}×100

(Rubbing Test)

The protective layer-equipped composite semipermeable membranes prepared in Examples 1 to 6 and Comparative Examples 2 to 5 and the composite semipermeable membrane prepared in Comparative Example 1 were cut into a predetermined shape and size to obtain samples. A raw water spacer (manufactured by Delstar Inc.; material: polypropylene; thickness: 34 mil) was cut into 4 cm×12 cm and placed on the skin layer side of the sample. A weight of 70 g was placed on the raw water spacer, and the raw water spacer was moved to rub the membrane surface on the skin layer side of the sample 10 times. Thereafter, the permeation flux and the salt rejection ratio were measured in the same manner as described above.

In the protective layer-equipped composite semipermeable membranes of Examples 1 to 6, the salt rejection ratio hardly decreased even when the membrane surface on the skin layer side is rubbed. This is thought to be because the skin layer was not damaged by the protective layer on the skin layer. In addition, water permeability was maintained high by performing water passing treatment to remove the protective layer as much as possible. On the other hand, the composite semipermeable membrane of Comparative Example 1 did not have a protective layer and thus the salt rejection ratio was significantly lowered because the skin layer was greatly damaged by rubbing. In the protective layer-equipped composite semipermeable membrane of Comparative Example 2, since the protective layer was formed with PVA that was not modified with carboxylic acids, the protective layer was not easily removed even if water passing treatment was performed and the water permeability was poor. In the protective layer-equipped composite semipermeable membranes of Comparative Examples 3 to 5, the protective layer was not sufficiently formed, and the salt rejection ratio was lowered because the skin layer was damaged by rubbing.

INDUSTRIAL APPLICABILITY

The spiral wound separation membrane element of the present invention is suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the element can be used for concentration of active ingredients in foodstuffs usage, for an advanced water treatment, such as removal of harmful component in water purification and sewage usage etc.

TABLE 1

| | Polyvinyl alcohol (PVA) | | | Content of PVA in protective layer (mg/m$^2$) | | Salt rejection ratio (%) | | Permeation flux (m$^3$/m$^2$ · d) | |
|---|---|---|---|---|---|---|---|---|---|
| | Item number | Modification | Concentration (% by weight) | Before water passing treatment | After water passing treatment | Before rubbing test | After rubbing test | Before rubbing test | After rubbing test |
| Example 1 | KL-318 | Modification of carboxylic acid | 0.7 | 1700 | 180 | 99.79 | 99.80 | 1.1 | 1.1 |
| Example 2 | KL-318 | Modification of carboxylic acid | 0.07 | 170 | 75 | 99.78 | 99.72 | 1.3 | 1.3 |
| Example 3 | KL-318 | Modification of carboxylic acid | 0.037 | 92 | 33 | 99.85 | 99.83 | 1.3 | 1.3 |
| Example 4 | KL-318 | Modification of carboxylic acid | 0.023 | 58 | 22 | 99.79 | 99.78 | 1.3 | 1.3 |
| Example 5 | KL-318 | Modification of carboxylic acid | 0.018 | 46 | 23 | 99.83 | 99.82 | 1.3 | 1.3 |
| Example 6 | KL-318 | Modification of carboxylic acid | 0.016 | 39 | 22 | 99.82 | 99.81 | 1.3 | 1.3 |
| Comparative Example 1 | — | — | — | — | — | 99.48 | 97.86 | 1.4 | 1.4 |
| Comparative Example 2 | NL-05 | — | 0.7 | 1700 | 526 | 99.77 | 99.75 | 0.9 | 0.9 |
| Comparative Example 3 | KL-318 | Modification of carboxylic acid | 0.007 | 17 | 17 | 99.74 | 99.32 | 1.3 | 1.3 |
| Comparative Example 4 | KL-318 | Modification of carboxylic acid | 0.0007 | 1.7 | 1.7 | 99.59 | 98.49 | 1.4 | 1.4 |
| Comparative Example 5 | KL-318 | Modification of carboxylic acid | 0.012 | 31 | 21 | 99.74 | 99.60 | 1.3 | 1.3 |

Moreover, the element can be used for waste water treatment in oil fields or shale gas fields.

The invention claimed is:

1. A method for producing a spiral wound separation membrane element, comprising:
   preparing a composite semipermeable membrane having a skin layer on the surface of a porous support;
   forming on the skin layer a protective layer containing 35 mg/m$^2$ or more of an anionic polyvinyl alcohol to prepare a protective layer-equipped composite semipermeable membrane;
   preparing an unwashed spiral wound separation membrane element from the protective layer-equipped composite semipermeable membrane; and
   passing wash water through the unwashed spiral wound separation membrane element to remove the protective layer on the skin layer.

* * * * *